US008595757B2

(12) United States Patent
White et al.

(10) Patent No.: US 8,595,757 B2
(45) Date of Patent: Nov. 26, 2013

(54) SYSTEM AND METHOD OF SHARING MEDIA CONTENT (75) Inventors: Scott White, Austin, TX (US); James Cansler, Jr., Pflugerville, TX (US); Charles Scott, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1108 days.

(21) Appl. No.: 12/042,886

(22) Filed: Mar. 5, 2008

(65) Prior Publication Data

US 2009/0228938 A1    Sep. 10, 2009

(51) Int. Cl.
*H04N 7/16*    (2011.01)
(52) U.S. Cl.
USPC ............... 725/25; 725/1; 725/8; 725/28
(58) Field of Classification Search
USPC ............................. 725/8, 25, 1, 28
See application file for complete search history.

(56) References Cited

U.S. PATENT DOCUMENTS

| 6,968,364 | B1 * | 11/2005 | Wong et al. ............... 709/217 |
| 6,973,662 | B1 * | 12/2005 | Sie et al. ............... 725/25 |
| 2004/0117818 | A1 * | 6/2004 | Karaoguz et al. ............... 725/31 |
| 2004/0172275 | A1 | 9/2004 | Gross |
| 2005/0108769 | A1 | 5/2005 | Arnold et al. |
| 2006/0109854 | A1 | 5/2006 | Cancel |
| 2006/0127039 | A1 | 6/2006 | van Stam |
| 2007/0199025 | A1 * | 8/2007 | Angiolillo et al. ............... 725/47 |

* cited by examiner

*Primary Examiner* — Nicholas Corbo
(74) *Attorney, Agent, or Firm* — Toler Law Group, PC (57) ABSTRACT A method of sharing media content is disclosed. A request is received at a network-connected media recorder to send a recording including media content to one or more users. At least one subscriber in the one or more users is identified, where the at least one subscriber is authorized to display the media content. At least one media device associated with the at least one subscriber is determined. The recording is sent to the at least one media device associated with the authorized subscriber.

25 Claims, 7 Drawing Sheets

SYSTEM AND METHOD OF SHARING MEDIA CONTENT

FIELD OF THE DISCLOSURE

The present disclosure is generally related to sharing media content.

BACKGROUND

Modern communication networks may be used to deliver media content, such as movies, television shows, or video-on-demand programs, to subscribers. A subscriber may use a digital video recorder to schedule and/or record media content. Recording media content on the digital video recorder allows the subscriber to view the recorded media content at a time that is convenient for the subscriber. However, if the subscriber fails to program the digital video recorder to record particular media content, then the subscriber may not be able to view the desired media content unless the desired media content is subsequently re-broadcast.

DETAILED DESCRIPTION

In a particular embodiment, a method of sharing recorded media content is disclosed. The method includes receiving a request at a network-connected media recorder to send a recording including media content to one or more users. The method includes identifying at least one subscriber from the one or more users, where the at least one subscriber is authorized to display the media content. The method also includes determining at least one media device associated with the at least one subscriber. The method further includes sending the recording to the at least one media device.

In another embodiment, the method includes receiving a request to send a recording including media content to a first media device. The recording is accessible to a second media device. The method also includes determining whether the first media device is authorized to display the media content. The method further includes sending the recording to the first media device after determining that the first media device is authorized to display the media content.

In another embodiment, a computer-readable storage medium is disclosed. The computer-readable storage medium includes operational instructions, that when executed by a processor at an authorization server, cause the processor to receive a request from a first media device to send a recording including media content to a second media device. The computer-readable storage medium also includes operational instructions, that when executed by the processor, cause the processor to determine whether the second media device is authorized to display the media content. The computer-readable storage medium also includes operational instructions, that when executed by the processor, cause the processor to send a message to the first media device based on whether the second media device is authorized to display the media content.

In another embodiment, a system for sharing recorded media content is disclosed. The system includes an interface to receive a request from a user to send a recording including media content to a first media device. The system also includes an authorization module to determine whether the first media device is authorized to display the recorded media content and to generate a message to the user after determining that the first media device is authorized to display the recorded media content.

Figure 1:
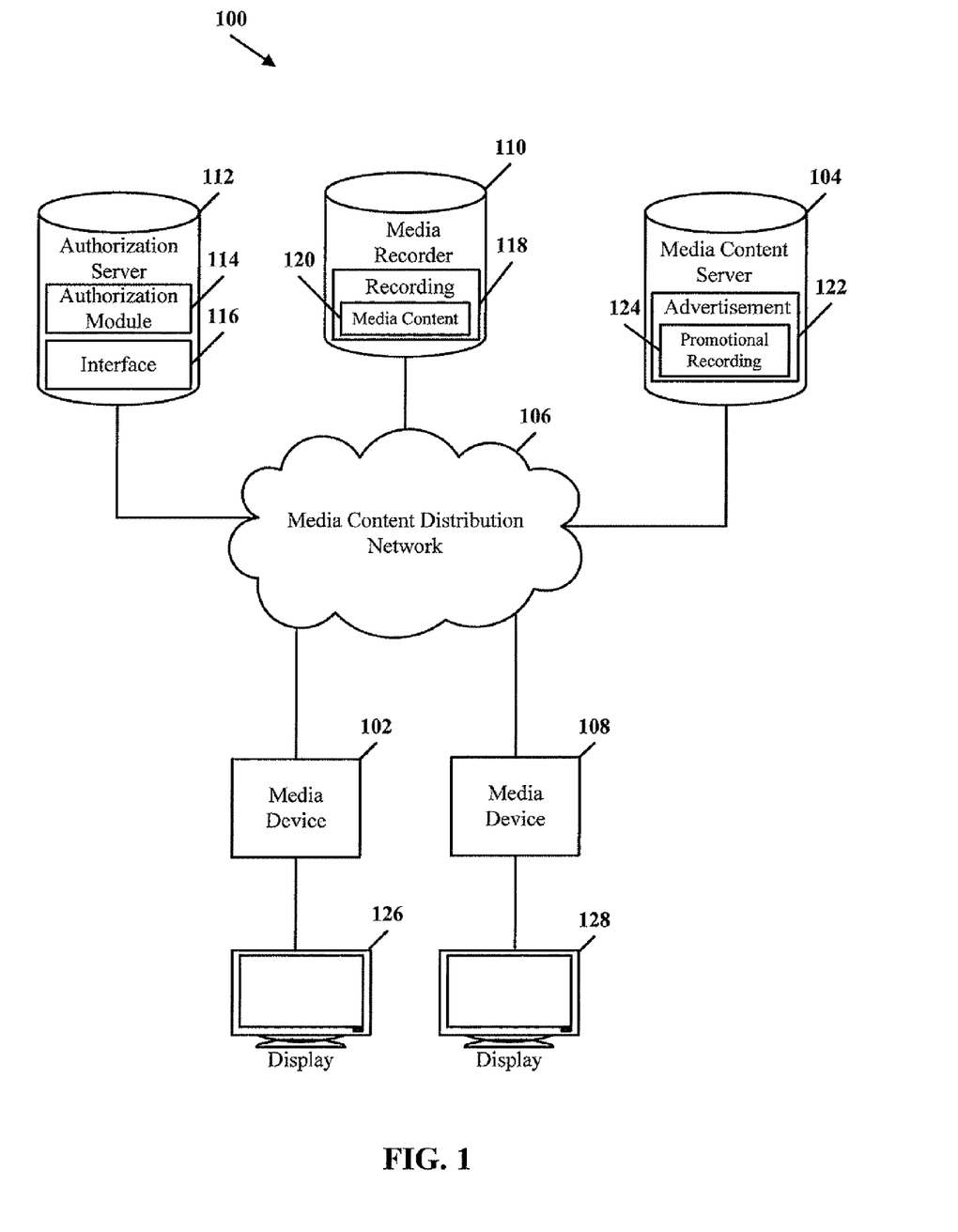
FIG. 1 is a block diagram of a first embodiment of a system to share media content.

FIG. 1 is a block diagram of a first illustrative embodiment of a system to share media content, generally designated 100. The system 100 includes a first representative media device 102 coupled to a representative media content server 104 via a media content distribution network 106. A representative second media device 108 is coupled to the media content distribution network 106, and a media recorder 110 and an authorization server 112 are also coupled to the media content distribution network 106.

The first media device 102 is adapted to display media content received via the media content distribution network 106 at a first representative display 126. The first display 126 may be integrated with the first media device 102 or may be separate from the first media device 102. The first media device 102 may be adapted to instruct the media recorder 110 to record media content. For example, the media recorder 110 may record media content to create a recording 118 that includes media content 120. The second media device 108 is adapted to display media content on a second representative display 128 and to instruct the media recorder 110 to record media content. The first media device 102 and the second media device 108 may display or record media content according to one or more subscription services. For example, the first media device 102 may be authorized to display or record the particular media content while the second media device 108 may not be authorized to display or record the particular media content based on a subscription status as determined by the authorization server 112.

The media content server 104 is adapted to distribute media content via the media content distribution network 106 to the first media device 102 and to the second media device 108. The media content server 104 may be adapted to distribute subscription-based media content, subscription-free media content, or a combination of both. The media content server 104 may also be adapted to distribute one or more advertisements, such as an advertisement 122 that provides information about the benefits of subscribing to subscription-based media content. The advertisement 122 may include a promotional recording 124 illustrating the benefits of subscribing to subscription-based media content. For example, the promotional recording 124 may include a trailer or selected portions of subscription-based media content such as movie clips or still pictures.

The media content distribution network 106 is adapted to distribute media content from the media content server 104 to the first media device 102 and to the second media device 108. In addition, the media content distribution network 106 may enable the transfer of the recording 118 from the media recorder 110 to the second media device 108. The media content distribution network 106 may be adapted to distribute media via a direct broadcast satellite (DBS) transmission network, an internet protocol (IP) based network, a hybrid fiber coax (HFC) network, any other media content distribution technology, or any combination thereof. The media content distribution network 106 may also include other network elements not illustrated in FIG. 1, such as a media library server, an electronic program guide (EPG) server, a billing server, other servers related to distributing media content, or any combination thereof.

The media recorder 110 is responsive to the first media device 102 and the second media device 108 to receive and record the media content 120 from the media content server 104 via the media content distribution network 106. The media recorder 110 may selectively record media content based on the subscription status of the media device 102 and the subscription status of the media device 108.

The authorization server 112 is adapted to determine whether the first media device 102 and the second media device 108 are authorized to display or record particular media content. For example, when a user of the first media device 102 subscribes to particular media content, the authorization server 112 may determine that the first media device 102 is authorized to display or record the particular media content. When a user of the first media device 102 does not subscribe to the particular media content, the authorization server 112 may determine that the first media device 102 is not authorized to display or record the particular media content.

The authorization server 112 includes an authorization module 114 and an interface 116. The interface 116 is adapted to receive and send messages to other devices coupled to the media content distribution network 106. The authorization module 114 may perform the various functions of the authorization server 112, including receiving a request, determining whether a device is authorized to display or record media content, determining a subscription status of a device, sending a response to a device, instructing a server to send media content to the device, and instructing a server not to send media content to the device. The authorization module 114 may be implemented in hardware, firmware, software, other programmable logic, or any combination thereof.

In operation, the first media device 102 may be authorized to display subscription-based media content on the display 126. For example, a user of the first media device 102 may subscribe to a media content service that enables the user to display the subscription-based media content via the first media device 102. The user of the first media device 102 may also be authorized to record the subscription-based media content at the media recorder 110 to create the recording 118 including the media content 120. Thus, the media content 120 may include subscription-based media content.

A user of the first media device 102 may wish to send the recording 118 to one or more users, such as a user of the second media device 108. For example, the user of the first media device 102 may have watched a movie and may instruct the first media device 102 to send the recording 118 of the movie to one or more friends or family members at locations remote from the user. The user of the first media device 102 may send a request via the first media device 102 to the authorization server 112. The request may ask the authorization server 112 to send the recording 118 to one or more users. For example, the request may request the authorization server 112 to send the recording 118 to one or more users, such as to the user of the media device 108.

The authorization module 114 may receive the request via the interface 116. The authorization module 114 may identify at least one subscriber in the one or more users, where a subscriber is a user who is authorized to display the media content. For example, the authorization module 114 may determine a subscription status of each intended recipient of the recording 118. The authorization module 114 may determine at least one media device associated with the at least one subscriber and send the recording 118 to the at least one media device. For example, if the user wishes to send the recording 118 to seven people and four of those seven people are subscribers, then the recording 118 may be sent to the four subscribers.

The message to the first media device 102 may identify the subscribers to which the recording 118 was sent. In a particular embodiment, the authorization module 112 retrieves the recording 118 from the media recorder 110 and sends the recording 118 to the at least one media device. In another embodiment, the authorization module 112 instructs the media recorder 110 to send the recording 118 to the at least one media device.

The authorization module 114 may identify at least one non-subscriber in the one or more users, where the non-subscribers are not authorized to display the media content. For example, if the user wishes to send the recording 118 to seven people and four of those seven are subscribers, then three of the seven are non-subscribers. The authorization module 114 may determine at least one media device associated with the at least one non-subscriber. The authorization module 114 may instruct the media content server 104 to send the promotional recording 124 to the at least one media device associated with the at least one non-subscriber. For example, the authorization module 114 may instruct the media content server 104 to send the promotional recording 124 to the second media device 108 after determining that the user of the second media device 108 does not subscribe to the media content 120. The promotional recording 124 may promote a subscription service that authorizes subscribers to display the media content 120. The promotional recording 124 may include a portion of the media content 120, an image based on the media content 120, an excerpt from a review of the media content 120, an interview with an actor associated with the media content 120, other information related to the media content 120, or any combination thereof.

In a particular embodiment, the portion of the media content 120 may be determined based on a user input. For example, a user may specify a portion of the media content 120, such as a car chase scene, and the user specified portion may be included in the promotional recording 124.

In a particular embodiment, the authorization module 114 may instruct the media content server 104 to send the advertisement 122, which includes the promotional recording 124, to the at least one non-subscriber after determining that the at least one non-subscriber is not authorized to display the recording 118. The advertisement 122 may include a link enabling the at least one non-subscriber to subscribe to the subscription service.

Thus, one subscriber may share media content with one or more users via the network-connected media recorder 110. For example, when a first subscriber is unable to record particular media content, a second subscriber may request authorization to share a recording of the media content with the first subscriber. When the second subscriber requests authorization to share content with an unauthorized subscriber, the unauthorized subscriber may instead receive promotional information related to the media content such as media clips, trailers, or other targeted promotional information. The subscriber may be allowed to select portions of the media content used in the promotional information. The unauthorized subscriber may also receive an offer to subscribe to the media content such as via the advertisement 122. Although only two representative media devices 102 and 108 are shown in FIG. 1, the system 100 may include any number of media devices. As used herein, a media device may be any device capable of receiving media content, such as a phone, a personal digital assistant (PDA), a laptop computer, a desktop computer, a handheld computing device, a portable music player, and a gaming device.

Figure 2:
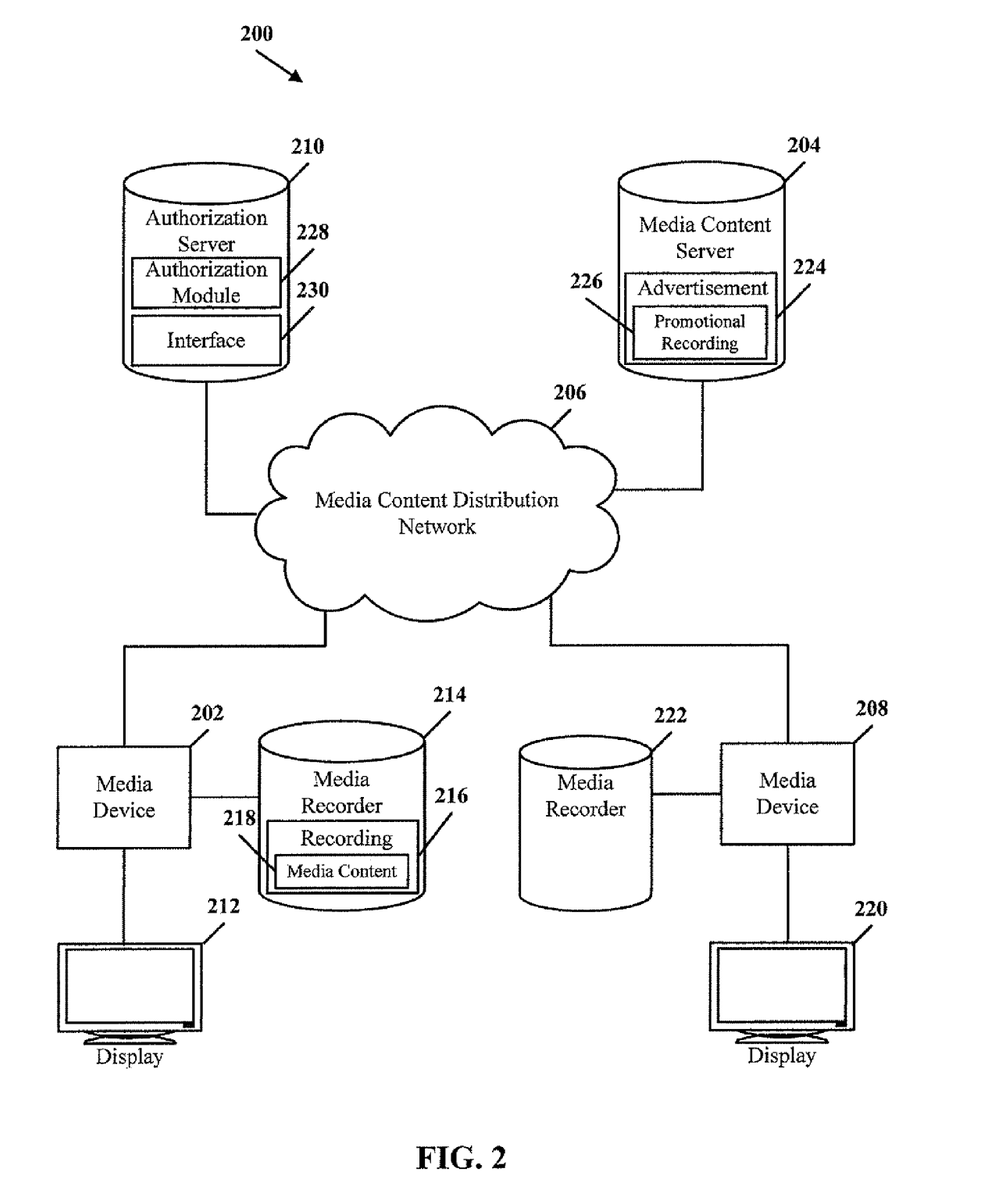
FIG. 2 is a block diagram of a second embodiment of a system to share media content.

FIG. 2 is a block diagram of a second illustrative embodiment of a system to share media content, generally designated 200. The system 200 includes a representative first media device 202 coupled to a representative media content server 204 via a media content distribution network 206. A second representative media device 208 is coupled to the media content distribution network 206, and an authorization server 210 is also coupled to the media content distribution network 206.

The first media device 202 is adapted to display media content received via the media content distribution network 206 at a first representative display 212. The first media device 202 is also coupled to a first representative media recorder 214. The first media recorder 214 may be adapted to record the received media content to create a recording 216 that includes media content 218. The second media device 208 is adapted to display media content on a second representative display 220 and may be adapted to access a second representative media recorder 222. The first media device 202 and the second media device 208 may display or record media content according to one or more subscription services. For example, the first media device 202 and the second media device 208 may not be authorized to display or record particular media content based on a subscription status as determined by the authorization server 210.

The media content server 204 is adapted to distribute media content via the media content distribution network 206 to the first media device 202 and to the second media device 208. The media content server 204 may be adapted to distribute subscription-based media content, subscription-free media content, or a combination of both. For example, the subscription-based media content may include one or more premium movie channels, such as HBO™ and Showtime™. The media content server 204 may include one or more advertisements, such as an advertisement 224 that corresponds to particular subscription-based media content. The advertisement 224 may include a promotional recording 226 that provides information regarding the benefits of subscribing to subscription-based media content. For example, the promotional recording 226 may include a trailer or selected portions of the particular media content such as movie clips or still pictures.

The media content distribution network 206 is adapted to distribute media content from the media content server 204 to the first media device 202 and to the second media device 208. In addition, the media content distribution network 206 may enable the transfer of the recording 216 from the first media recorder 214 to the second media device 208. The media content distribution network 206 may be adapted to distribute media via a direct broadcast satellite (DBS) transmission network, an internet protocol (IP) based network, a hybrid fiber coax (HFC) network, any other media content distribution technology, or any combination thereof. The media content distribution media network 206 may also include other network elements not illustrated in FIG. 2, such as a media library server, an electronic program guide (EPG) server, a billing server, one or more other servers related to distributing media content, or any combination thereof.

The authorization server 210 is adapted to determine whether the first media device 202 and the second media device 208 are authorized to display or record particular media content. For example, when a user of the first media device 202 subscribes to particular media content, the authorization server 201 may determine that the first media device 202 is authorized to display or record the particular media content. When a user of the first media device 202 does not subscribe to the particular media content, the authorization server 210 may determine that the first media device 202 is not authorized to display or record the particular media content.

The authorization server 210 includes an authorization module 228 and an interface 230. The interface 230 may be adapted to receive and send messages to other devices coupled to the media content distribution network 206. The authorization module 228 may perform the various functions of the authorization server 210, including receiving a request, determining whether a device is authorized to display or record media content, determining a subscription status of a device, sending a response to a device, instructing a server to send media content, and instructing a server not to send media content. The authorization module 230 may be implemented in hardware, firmware, software, other programmable logic, or any combination thereof.

In operation, the first media device 202 may be authorized to display subscription-based media content on the display 212. For example, the subscription-based media content may be a pay-per-view program, a television show, a movie, an interactive game, other subscription-based media content, or any combination thereof. The first media device 202 may also be authorized to record the subscription-based media content at the media recorder 214 to create a recording 216 including the media content 218. Thus, the media content 218 may include subscription-based media content.

A user of the first media device 202 may wish to share the recording 216 with a user of the second media device 208. For example, the user of the first media device 202 may have watched a movie and may instruct the first media device 202 to send the recording 216 of the movie to a friend or family member at a remote location. The first media device 202 may send a request from the first media device 202 to the authorization server 210. The request may ask for authorization to send the recording 216 to the media device 208. The authorization module 228 may receive the request via the interface 230 and determine whether the second media device 208 is authorized to display the recording. For example, the authorization module 228 may determine a subscription status of the second media device 208 and determine whether the second media device 208 is authorized to display the recording based on the subscription status. The authorization module 228 may generate a message to the first media device 202 after determining that the second media device 208 is authorized to display the recording.

In a particular embodiment, when the recording 216 is accessible to the first media device 202, such as at the media recorder 214 the message may authorize the first media device 202 to send the recording 216 to the media device 208. In another particular embodiment, the message may request the recording 216 from the first media device 202. The authorization module 228 may receive the recording 216 from the first media device 202 and then send the recording 216 to the second media device 208.

However, when the second media device 208 is not authorized, the authorization server 210 may instead instruct the media content server 204 to send the promotional recording 226, the advertisement 224, or both, to the second media device 208 after determining that the second media device 208 is not authorized to display the recording 216. For example, when the first media device 202 has a subscription to a particular media content channel and the second media device 208 does not have a subscription to the particular media content channel, then the authorization module 210 may send a message instructing the media content server 204 to deliver the promotional recording 226 to the second media device 208. The promotional recording 226 may promote a subscription service that authorizes subscribers to display the media content 218. For example, the promotional recording 226 may include a portion of the media content 218, an image based on the media content 218, an excerpt from a review of the media content 218, an interview with an actor associated with the media content 218, other information related to the media content 218, or any combination thereof.

In a particular embodiment, the authorization module 228 sends the advertisement 224 that includes the promotional recording 226, to the second media device 208 after determining that the second media device 208 is not authorized to display the recording 216. The advertisement 224 may include a link enabling the user of the second media device 208 to subscribe to the subscription service that authorizes the second media device 208 to display the recording 216.

Thus, two or more subscribers may share recorded media content between media devices. For example, when one subscriber is unable to record particular media content, a second subscriber may share a recording of the media content with the first subscriber. When a subscriber requests to share content with an unauthorized subscriber, the unauthorized subscriber may instead receive promotional information related to the media content, such as media clips, trailers, or other targeted promotional information. The subscriber may be allowed to select portions of the media content to be used in the promotional information. The unauthorized subscriber may also receive an offer to subscribe to the media content. Although only two representative media devices 202 and 208 are shown in FIG. 2, the system 200 may include any number of media devices.

Figure 3:
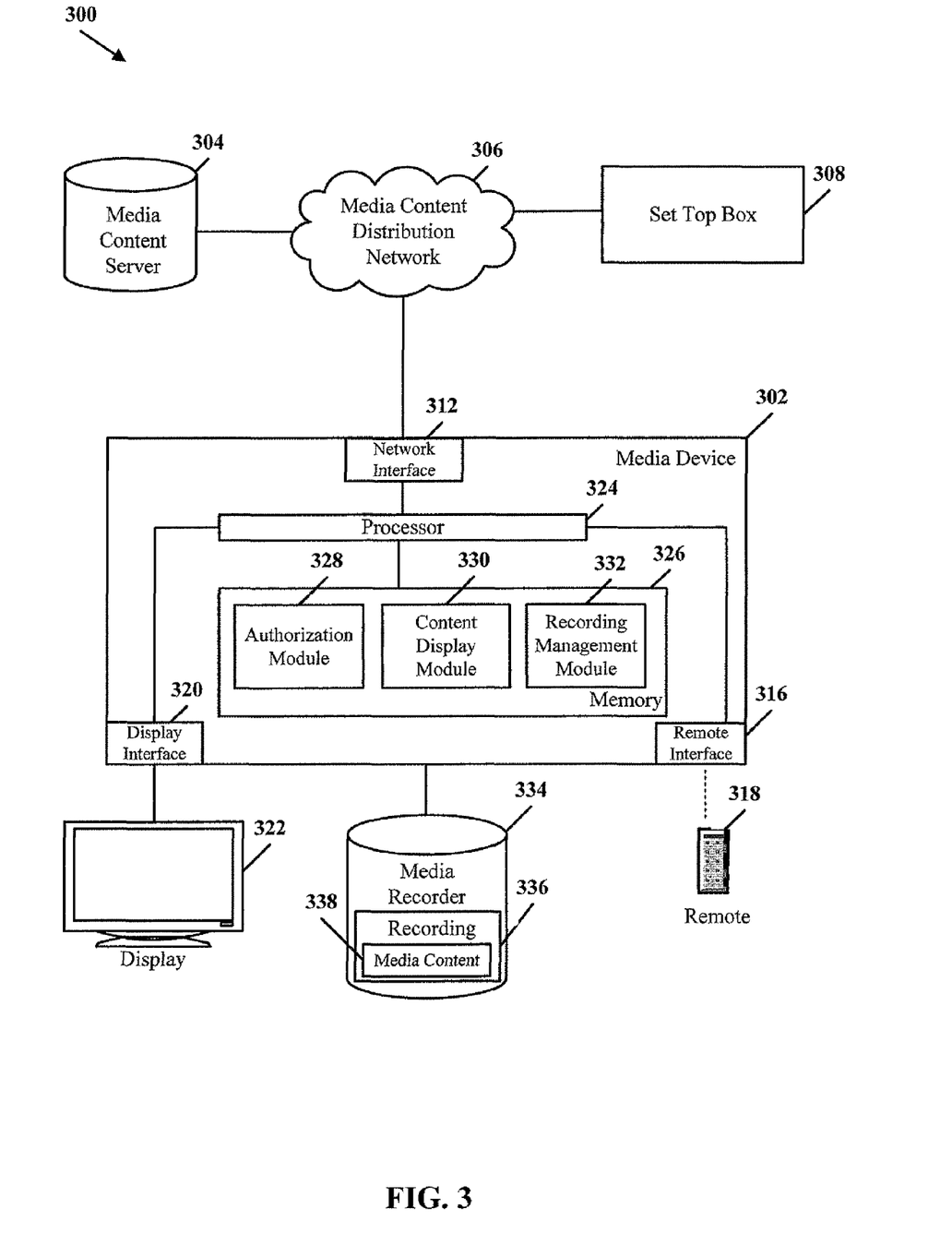
FIG. 3 is a block diagram of a third embodiment of a system to share media content.

FIG. 3 is a block diagram of a third embodiment of a system to share media content, generally designated 300. The system 300 includes a representative first media device 302 to receive media content from a representative media content server 304 via a media content distribution network 306. A representative second media device 308 is coupled to the media content distribution network 306.

The media content server 304 is adapted to distribute media content, advertisements, and promotional information to one or more media devices similar to the media content server 204 in FIG. 2.

The media device 302 is coupled to the media content distribution network 306 via a network interface 312. The media device 302 includes a remote interface 316 adapted to receive user input via a remote control unit 318. The media device 302 includes a display interface 320 adapted to display media content received at a display 322. The media device 302 includes a processor 324 adapted to execute logic instructions in memory 326. The memory 326 includes an authorization module 328, a content display module 330, and a recording management module 326. The media device 302 may be adapted to access a media recorder 334 to create a recording 336 of media content 338.

In operation, the authorization module 328, the content display module 330, and the recording management module 326 may include logic or instructions executable by the processor 324 to perform various functions of the media device 102. For example, the authorization module may determine whether the media device 302 is authorized to display media content on the display 322 and to record media content on the media recorder 334. The authorization module 328 may determine whether the first media device 302 or the second media device 308, is authorized to display particular media content. The content display module 330 may display authorized media content on the display 322 via the display interface 320. The recording management module 326 may be used to create, playback, and delete the recording 336 at the media recorder 334, and to send the recording 336 from the media recorder 334 to a subscriber. The modules 328-332 may be implemented in hardware, firmware, software, other programming logic, or any combination thereof.

Figure 4:
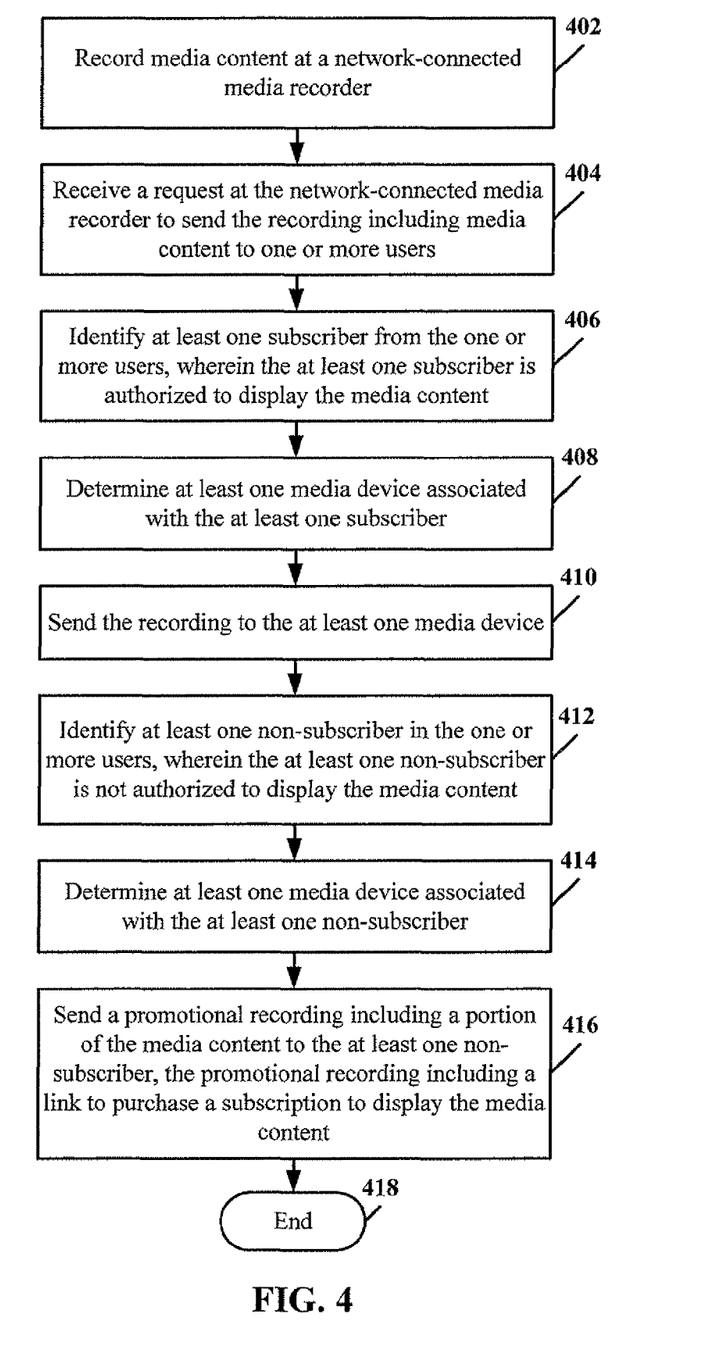
FIG. 4 is a flow diagram of a first particular embodiment of a method of sharing media content.

FIG. 4 is a flow diagram of a first particular embodiment of a method of sharing media content. One or more modules at a media device, such as the media device 302 of FIG. 3, may execute the method. At 402, media content is recorded at a network-connected media recorder. Proceeding to 404, a request is received at the network-connected media recorder to send a recording including media content to one or more users. Moving to 406, at least one subscriber from the one or more users is identified, where the at least one subscriber is authorized to display the media content. For example, an authorization module may determine whether each of the one or more users is authorized by determining a subscription status of the second media device. For example, the authorization module may be the authorization module 128 in FIG. 1, the authorization module 214 in FIG. 2, or the authorization module 328 in FIG. 3. Continuing to 408, at least one media device associated with the at least one subscriber is determined. For example, a subscriber may have one or more media devices associated with the subscriber.

Proceeding to 410, the recording is sent to the at least one media device. Moving to 412, at least one non-subscriber in the one or more users is identified, where the at least one non-subscriber is not authorized to display the media content. Advancing to 414, at least one media device associated with the at least one non-subscriber is determined. Proceeding to 416, a promotional recording including a portion of the media content is sent to the at least one non-subscriber, where the promotional recording includes a link to purchase a subscription to display the media content. For example, the link may enable the non-subscriber to purchase a subscription to become a subscriber of the media content. The advertisement may include a promotional recording promoting the media content. In one illustrative embodiment, the promotional recording is created at a media content server. In another illustrative embodiment, the promotional recording is created at the first media device based on a user input. The method ends at 418.

Figure 5:
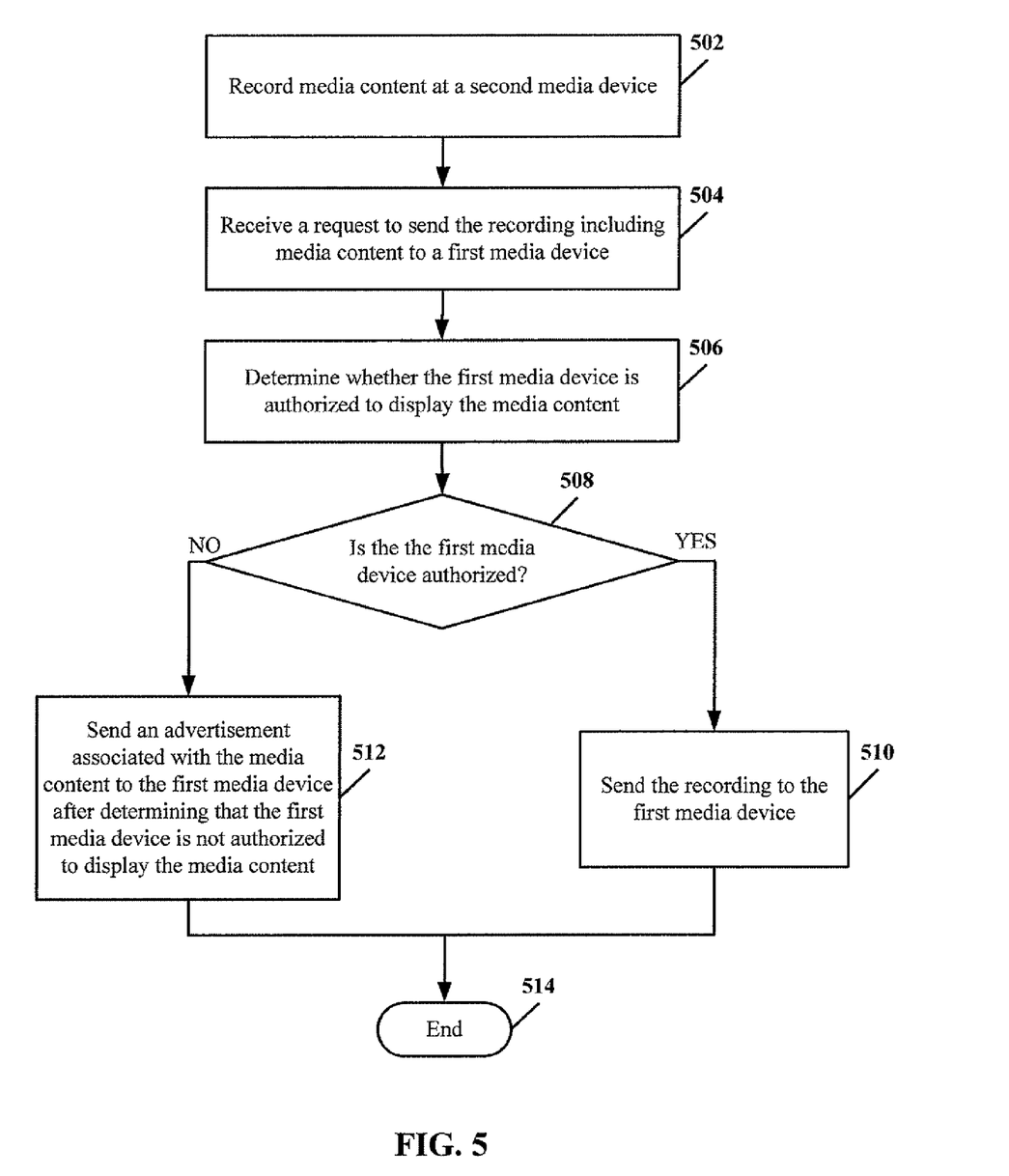
FIG. 5 is a flow diagram of a second particular embodiment of a method of sharing media content.

FIG. 5 is a flow diagram of a second particular embodiment of a method of sharing media content. One or more modules at a media device, such as the media device 302 of FIG. 3, may execute the method. At 502, media content is recorded at a network-connected media recorder. For example, a first media device may be authorized to record media content at the network-connected media recorder. The recording is accessible to the network-connected media recorder because the media content was recorded at the network-connected media recorder. Proceeding to 504, a request from the first media device is received to allow a second media device to display the recording.

Moving to 506, a determination is made as to whether the second media device is authorized to display the media content. Continuing to 508, if the second media device is authorized, then the method moves to 510, and the recording is sent to the second media device. The method then ends at 514. If, at 508, the second media device is not authorized, then the method proceeds to 512, and a promotional recording that may include at least a portion of the media content, is sent to the second media device. The promotional recording may include a portion of the media content, an image based on the media content, an excerpt from a review of the media content, an interview of an actor, other information related to the media content, or any combination thereof. For example, the portion of the media content of the promotional recording may be determined based on a user input at the first media device. The method then ends at 514.

Figure 6:
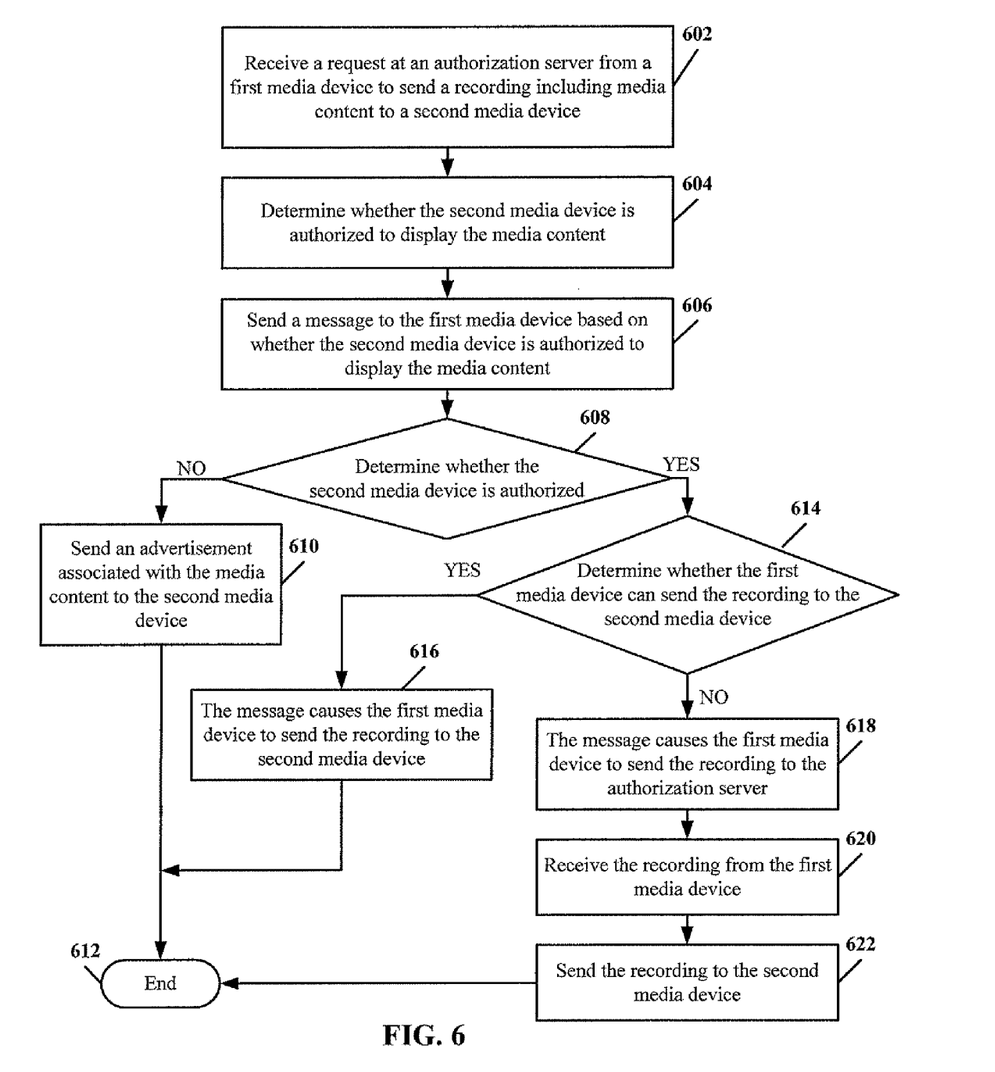
FIG. 6 is a flow diagram of a third particular embodiment of a method of sharing media content.

FIG. 6 is a flow diagram of a third particular embodiment of a method of sharing media content. In a particular embodiment, one or more modules at an authorization server, such as the authorization server 110 in FIG. 1, may execute the method. At 602, a request is received at an authorization server from a first media device to send a recording including media content to a second media device. The recording is accessible to the first media device. Proceeding to 604, a determination is made whether the second media device is authorized to display the media content. Moving to 606, a message is sent to the first media device based on whether the second media device is authorized to display the media content. Continuing to 708, a determination is made whether the second media device is authorized.

If, at 608, a determination is made that the second media device is not authorized, then the method proceeds to 610. At 610, an advertisement associated with the media content is sent to the second media device, and the method ends at 612. If, at 608, a determination is made that the second media device is authorized, then the method proceeds to 614. At 614, a determination is made whether the first media device can send the recording to the second media device. If, at 614, a determination is made that the first media device can send the recording to the second media device, then at 616, the message causes the first media device to send the recording to the second media device, and the method ends at 612.

If, at 614, a determination is made that the first media device cannot send the recording to the second media device, then, at 618, the message causes the first media device to send the recording to the authorization server. Advancing to 620, the recording is received from the first media device. Proceeding to 622, the recording is sent to the second media device. The method ends at 612.

Figure 7:
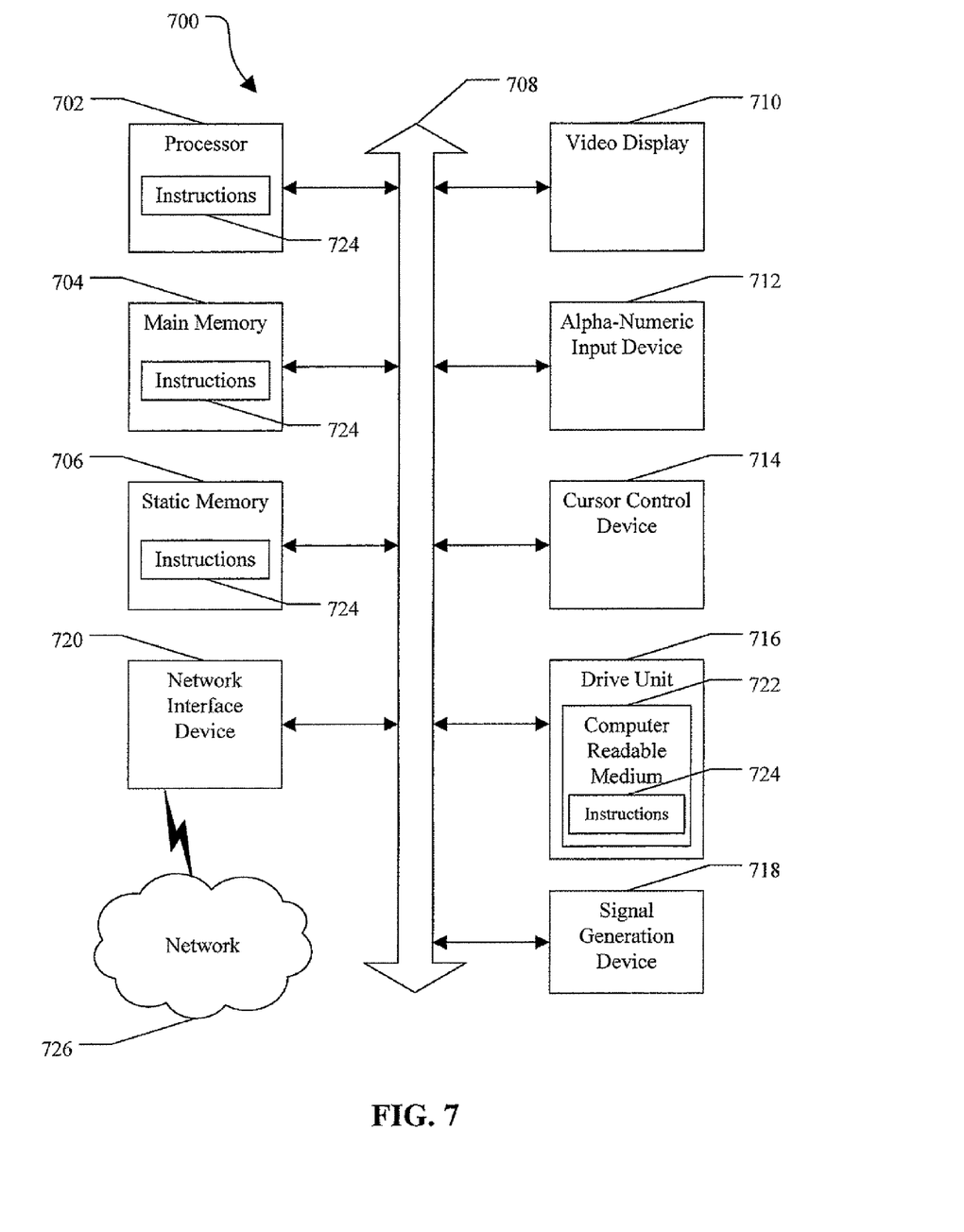
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including an authorization server, a media content server, a media recorder, a network-connected media recorder, or a media device, as shown in FIG. 1, FIG. 2 and FIG. 3.

In a networked deployment, the computer system may operate in the capacity of a server, such as a video server or application server, or a media device. The computer system 700 can also be implemented as or incorporated into various devices, such as a personal computer (PC), a tablet PC, a media device (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid-state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying out a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving a request, at a network-connected media recorder from a first user device that has access rights to a recording including subscription-based media content, to send the recording to a user;
   determining, at the network connected media recorder via an authorization server, a non-authorized media device associated with the user in response to a determination that the user is not a subscriber to a service that enables display of the subscription-based media content;
   receiving user input from the first user device at the network-connected media recorder, wherein the user input specifies a portion of the media content to send to the non-authorized media device as a part of a promotional recording for the service; and
   sending an instruction from the network-connected media recorder to a media content server to have the promotional recording with the portion of the media content specified by the user input sent to the non-authorized media device, wherein the promotional recording includes a link to purchase a subscription to the service.

2. The method of claim 1, wherein the media content is recorded at the network-connected media recorder prior to receiving the request.

3. The method of claim 2, wherein the request is sent from the first user device by a first user different than the user, and wherein the first user is authorized to record the media content at the network-connected media recorder.

4. The method of claim 1, further comprising sending a message to the first user device, wherein the message identifies the user as a subscriber in response to a determination that the user subscribes to the service that enables display of the subscription-based media content.

5. The method of claim 1, wherein the promotional recording includes, an image based on the media content, an excerpt from a review of the media content, an interview of an actor, or a combination thereof.

6. The method of claim 5, wherein the first user device comprises a mobile communication device.

7. A method, comprising:
receiving a request at an authorization server to send a recording including subscription-based media content to a first media device, wherein the request is sent from a second media device that is different than the first media device;
determining, at the authorization server, whether the first media device is authorized to display the subscription-based media content based on a subscription status of the first media device;
sending, via the authorization server in response to the request, a message to the second media device authorizing the recording to be sent to the first media device when the first media device is authorized to display the subscription-based media content based on the subscription status; and
sending, via the authorization server to a media content server in response to the request, an instruction to send an advertisement associated with the subscription-based media content to the first media device when the first media device is not authorized to display the subscription-based media content based on the subscription status.

8. The method of claim 7, wherein the subscription-based media content is recorded at the second media device prior to receiving the request.

9. The method of claim 7, wherein the advertisement promotes a subscription to a service that enables the first media device to display the subscription-based media content.

10. The method of claim 7, wherein the advertisement includes a promotional recording promoting the subscription-based media content.

11. The method of claim 10, wherein the promotional recording is created at the media content server.

12. The method of claim 10, wherein a user input received at the second media device determines at least a portion of the subscription-based media content to be used in the promotional recording.

13. The method of claim 7, wherein the message requests that the second media device send the recording to the authorization server to be forwarded to the first media device.

14. A method, comprising:
receiving, from a first media device at an authorization server, a request to send a recording including subscription-based media content to a second media device that is different than the first media device, the recording accessible to the first media device;
determining, via the authorization server, whether the second media device is authorized to display the subscription-based media content based on a subscription status of the second media device;
sending a message to the first media device via the authorization server in response to the request when the second media device is authorized to display the subscription-based media content; and
sending an instruction to a media content server via the authorization server in response to the request when the second media device is not authorized to display the subscription-based media content, wherein the instruction instructs the media content server to send an advertisement associated with the subscription-based media content to the second media device.

15. The method of claim 14, wherein the message causes the first media device to send the recording to an authorization server.

16. The method of claim 15, further comprising receiving the recording from the first media device.

17. The method of claim 16, further comprising sending the recording to the second media device.

18. The method of claim 14, wherein the message causes the first media device to send the recording to the second media device.

19. The method of claim 14, further comprising sending a request to the first media device to identify a portion of the subscription-based media content to be included in the advertisement.

20. A system, comprising:
a processor;
an interface coupled to the processor, the interface to receive a request from a first media device to send subscription-based media content to a second media device that is different than the first media device; and
a memory coupled to the processor, the memory including instructions executable by the processor to perform operations including:
determining whether a subscription status of the second media device enables the second media device to display the subscription-based media content;
generating a message to the first media device in response to the request when the second media device is enabled to display the subscription-based media content; and
sending an instruction to a media content server in response to the request when the second media device is not enabled to display the subscription-based media content, wherein the instruction instructs the media content server to have a promotional recording sent to the second media device, wherein the promotional recording includes a link to purchase a subscription that enables the second media device to display the subscription-based media content.

21. The system of claim 20, wherein the subscription-based media content is accessible to the first media device, and wherein the message authorizes the first media device to send the recording to the second media device.

22. The system of claim 20, wherein the recording is accessible to the first media device, wherein the message requests the recording from the first media device, and wherein the operations further include receiving the recording from the first media device and sending the recording to the second media device.

23. The system of claim 20, wherein the recording is accessible to the interface and wherein the operations further include retrieving the recording and sending the recording to the second media device.

24. The system of claim 20, wherein the subscription-based media content includes a game.

25. The system of claim 20, wherein the interface is configured to be coupled via a media content distribution network to the first media device and to the second media device.

* * * * *